F. SCHULDER.
REGULATING MEANS FOR SELF CLOSING VALVES.
APPLICATION FILED AUG. 20, 1917.

1,287,461.

Patented Dec. 10, 1918.

Witness
G. E. KRICKER.

Inventor
F. SCHULDER.
By Fisher & Moser
Attorney

UNITED STATES PATENT OFFICE.

FRED SCHULDER, OF CLEVELAND, OHIO, ASSIGNOR TO UNITED BRASS MANUFACTURING COMPANY, A PARTNERSHIP COMPOSED OF WM. J. SCHOENBERGER AND BENJAMIN F. KLEIN, DOING BUSINESS AT CLEVELAND, OHIO.

REGULATING MEANS FOR SELF-CLOSING VALVES.

1,287,461.  Specification of Letters Patent.  Patented Dec. 10, 1918.

Application filed August 20, 1917. Serial No. 187,152.

*To all whom it may concern:*

Be it known that I, FRED SCHULDER, a citizen of the United States, residing at Cleveland, in the county of Cuyahoga and State of Ohio, has invented certain new and useful Improvements in Regulating Means for Self-Closing Valves, of which the following is a specification.

This invention pertains to regulating means for self-closing valves, and the invention is of particular utility in connection with the construction shown in my application Ser. No. 149,156, filed February 17, 1917, in which I make disclosure of practically all the parts shown herein except the regulating means. This means is adjustable and especially adapted to limit the opening of the valve, more or less, to regulate the outflow of water, as for a bubbling fountain or the like, and all as hereinafter more fully described.

Figure 1:
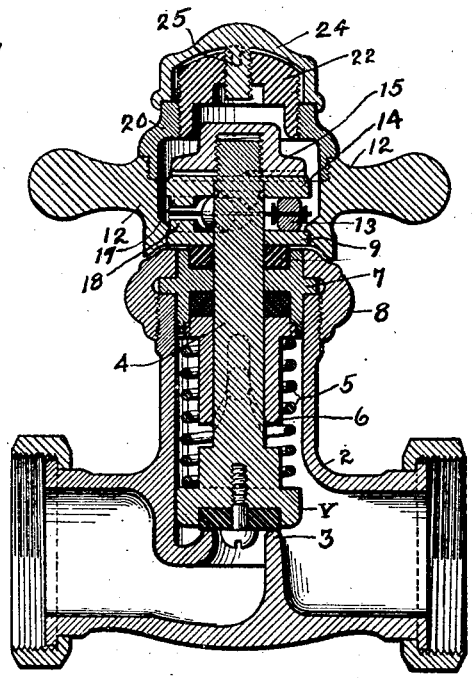
Figure 2:
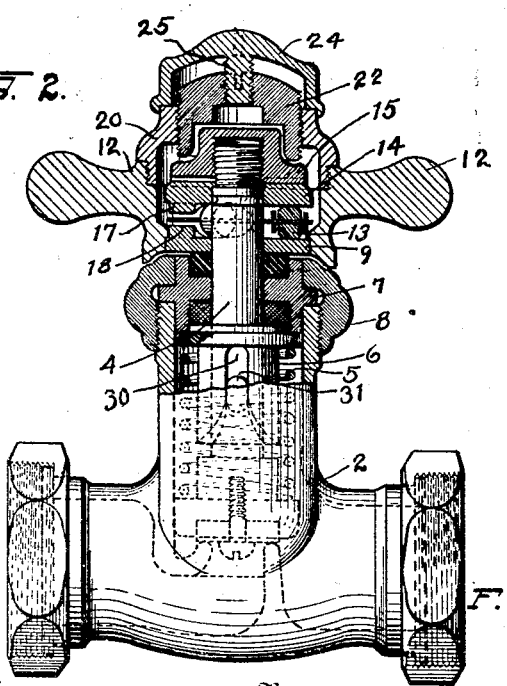

In the accompanying drawings, Figure 1 is a vertical sectional elevation of the faucet as a whole showing the parts in position to open the valve approximately to the maximum. Fig. 2 is a sectional elevation of the faucet showing the regulating device set to limit the opening of the valve approximately to the minimum.

The body 2 of the faucet may be of any preferred shape or style, and is shown as having a valve seat 3 adapted to be engaged by a valve $v$ having a stem 4 and a coiled spring 5 to press the valve normally down upon its seat. Stem 4 projects upward through a tubular gland or follower 6 and a packing ring 7 having an annular flange clamped in place upon the body by a union nut 8. Packing material of any suitable kind is placed inside of ring 7, and a flat disk 9 forming the bottom of a rotatable handle 12 bears against an anti-friction washer 11 made of hard fiber or other suitable material in the top of ring 7. Disk 9 has an upper cam surface and is fixed in the base of the handle member 12 and adapted to rotate therewith around the valve stem. The valve stem is prevented from rotating by its lugs 31 which ride within slots 30 in follower 6, and the stem is raised and lowered by rollers 13 and a second cam disk 14 is slidably keyed to the upper end of the valve stem and locked by a flanged nut 15 having radial serrations or their equivalent on its bottom engaged in channels or the like in the top of disk 14. The bottom face of disk 14 has undulations or inclined cam surfaces 17 corresponding to similar surfaces 18 on the top of cam disk 9 so that when the handle is rotated the rollers will lift the valve stem and valve, but the handle remains seated and does not rise during such movements.

A reducing ring 20 is screwed within the upper part of handle 12 and its upper reduced end is screw-threaded internally to receive a cup-shaped nut 22 which is adapted to be screwed from above to different elevations relatively to the upper end of the screw stem 4 according to the measure of opening desired for the time being for valve $v$. This brings the description of this application up to what may be termed the material improvements over the pending application above referred to, and which improvements particularly involve the ring member 20, the cup-shaped nut 22 axially adjustable therein and the cap 24 seated on the ring over said nut 22. Cap 24 is provided with a screw-threaded stem 25 centrally therein to engage the threaded hole centrally through nut 22, whereby the cap is held down in place and the nut 22 is locked in any adjusted position. Nut 22 has a cavity or space in its lower portion of a size to accommodate the head or top of flanged nut 15 fixed over the valve spindle and adjustment of nut 22 is made by removing cap 24 and turning or screwing the nut down more or less, say from its position as shown in Fig. 1 to the position in Fig. 2, according to the degree of opening wanted for valve $v$ as above described. After adjustment of said nut the cap is restored to lock and conceal the nut, and the handle may be rotated only to the degree permitted by the spaced adjustment between the parts.

The operation of the said parts would be substantially the same if valve stem 4 projected through the nut 15 so as to be engaged directly at its end by the nut 22 instead of through the medium of the top or head of the nut 15 which overlies said stem. If preferred the cap 24 may be provided with internal screw threads to engage the external screw threads on nut 22. In that event stem 25 might be omitted and the cap screwed directly upon the nut 22 about the outside thereof.

What I claim is:

1. In a valve, a valve having a stem, a non-rising rotatable handle, a means within said handle to operate said stem upon rotation of the handle, and means adjustably mounted upon one of said parts within said handle to limit the movement of said stem.

2. In a self-closing valve, a valve and a stem thereon, a rotatable handle and means to impart an axial movement to said stem upon rotation of the handle, and a member carried by said handle apart from the said stem adapted to be lowered more or less to limit the rotation of the handle and the lift of the valve from its seat.

3. In a self-closing valve, a valve and a stem thereon, a handle member and means operatively engaged with said stem to raise and lower it upon rotative movements of said handle, and a screw nut supported by said handle member opposite the end of said stem and adapted to be raised and lowered to fix the limit of movement of the stem in opening the valve.

4. A self-closing valve, comprising a body and a valve and stem therein and having cam and spring-operating parts and a rotatable handle member, a ring in the top of said handle, and a substantially cup-shaped nut screwed into said ring opposite said valve stem and adapted to be adjustably fixed therein to limit the raising of the valve from its seat.

5. A self-closing valve, comprising a valve having a stem and a rotatable handle member and means through which the valve is raised from its seat on rotation of the handle, and means mounted on said handle member to limit the raising of the valve comprising a screw nut opposite said valve stem and adjustable in respect thereto and a cap having screw-threaded engagement with said nut.

6. A self-closing valve, comprising a body having a valve and stem therein and a rotatable handle and means to operate the stem on rotation of the handle, said handle having a screw nut to limit the movement of the stem and a cap member to cover and lock the nut.

Signed at Cleveland, in the county of Cuyahoga and State of Ohio, this 17th day of August, 1917.

FRED SCHULDER.

Copies of this patent may be obtained for five cents each, by addressing the "Commissioner of Patents, Washington, D. C."